United States Patent [19]

Keller

[11] 4,359,620
[45] Nov. 16, 1982

[54] INDUCTION HEATING APPARATUS

[75] Inventor: Joseph R. Keller, Harrisburg, Pa.

[73] Assignee: AMP Incorporated, Harrisburg, Pa.

[21] Appl. No.: 104,254

[22] Filed: Dec. 17, 1979

Related U.S. Application Data

[63] Continuation-in-part of Ser. No. 857,955, Dec. 6, 1977, abandoned.

[51] Int. Cl.³ .......................... H05B 6/10; H05B 6/40
[52] U.S. Cl. .......................... 219/10.73; 219/10.75; 219/10.43; 219/10.79
[58] Field of Search .............. 219/10.73, 10.79, 10.75, 219/10.77, 10.57, 10.53, 10.67, 10.69, 10.41, 10.43, 6.5, 7.5, 9.5, 85 A, 85 F, 85 M, 56.1

[56] References Cited

U.S. PATENT DOCUMENTS

| | | | |
|---|---|---|---|
| 1,725,465 | 8/1929 | Manson | 219/10.41 |
| 1,996,502 | 4/1935 | Brown | 219/10.57 |
| 2,503,429 | 4/1950 | Ziegler | 219/85 A |
| 2,509,713 | 5/1950 | Achard | 219/10.57 X |
| 2,945,112 | 7/1960 | Scott | 219/10.77 |
| 3,391,329 | 7/1968 | Meyer | 219/10.77 |
| 3,467,806 | 9/1969 | Dixon | 219/9.5 X |
| 3,798,403 | 3/1974 | Mitchell et al. | 219/10.73 X |
| 3,845,268 | 10/1974 | Sindt | 219/10.77 |
| 4,017,701 | 4/1977 | Mittelmann | 219/10.79 X |

Primary Examiner—B. A. Reynolds
Assistant Examiner—Philip H. Leung
Attorney, Agent, or Firm—Frederick W. Raring

[57] ABSTRACT

An induction heating apparatus for heating an electrically conductive workpiece, comprising a C-shaped core made of a material having a high magnetic permeability and having two closely opposed tapered ends, an exciting coil surrounding the core, and a circuit for supplying a periodic voltage to the coil so as to cause a varying magnetic field to be produced in the core and to efficiently focus a field of high flux density between its two ends. In one embodiment the core is made of ferrite, a capacitance is connected with the exciting coil to form a resonant circuit, and circuitry is provided for detecting the phase of the current flowing in the resonant circuit and for controlling the frequency and phase of the periodic voltage supplied to the resonant circuit so as to maintain the circuit in resonance. In other embodiments, one of the two ends of the core is mounted on a slidable ram portion, which can be moved toward and away from the other end of the core, and electrically insulating workholders can be mounted on each end of the core to hold a workpiece in place as the ends of the core are pushed toward each other.

21 Claims, 12 Drawing Figures

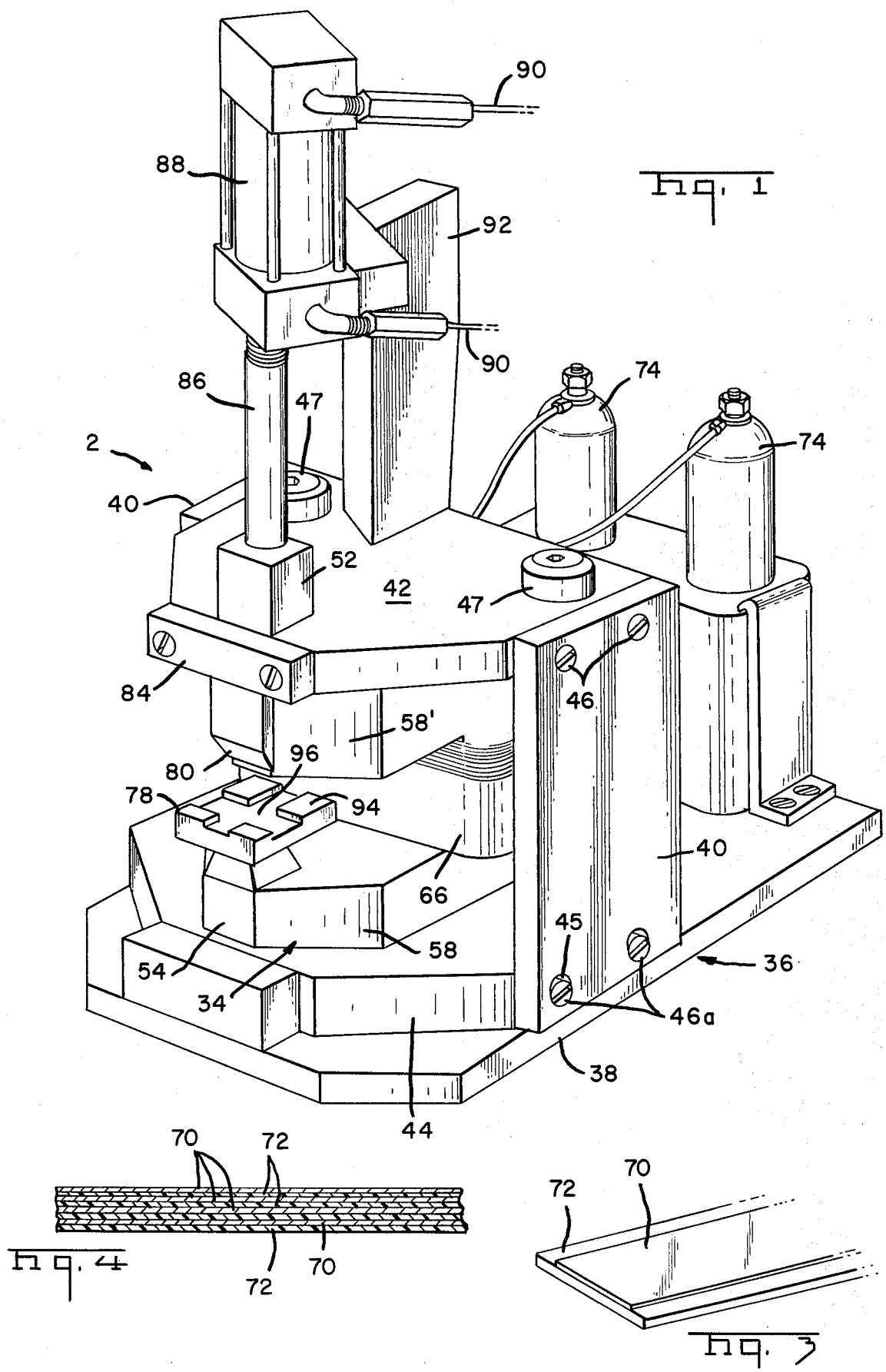

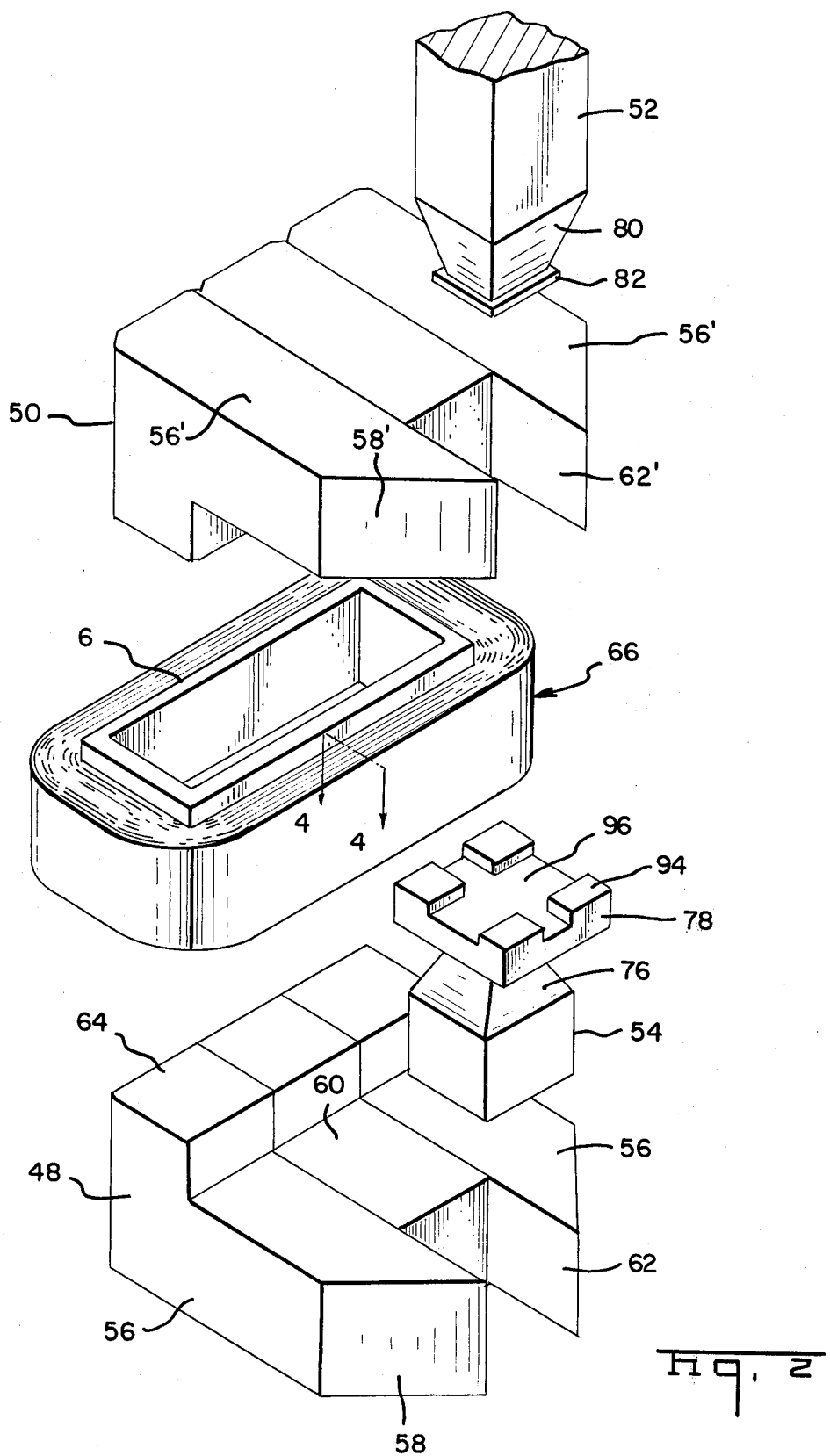

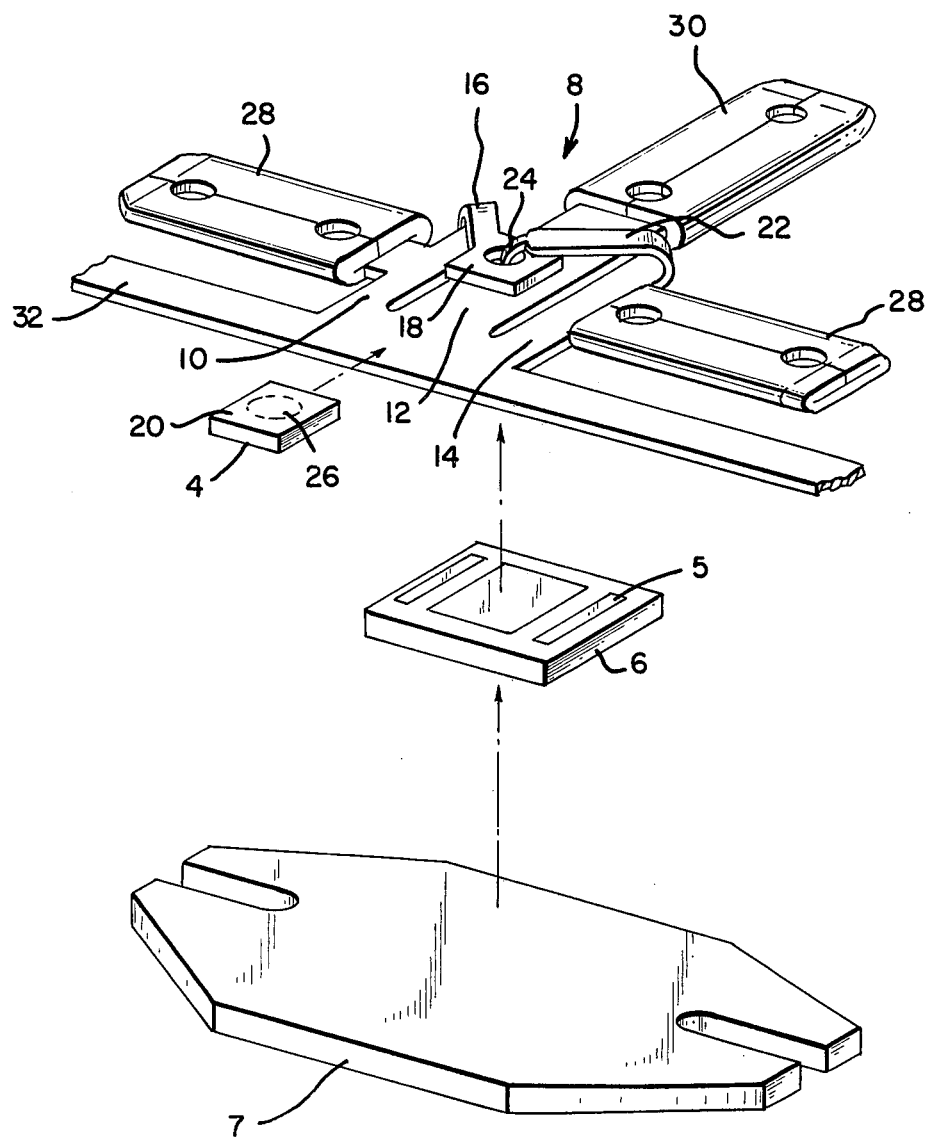

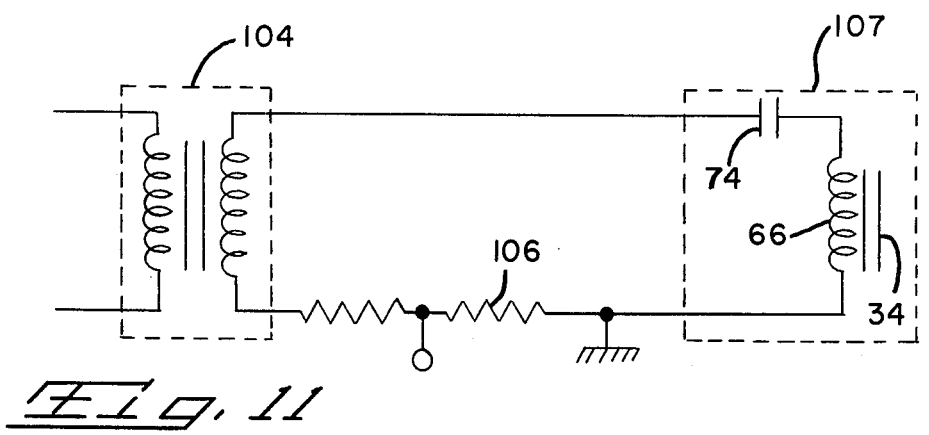
_Fig. 11_
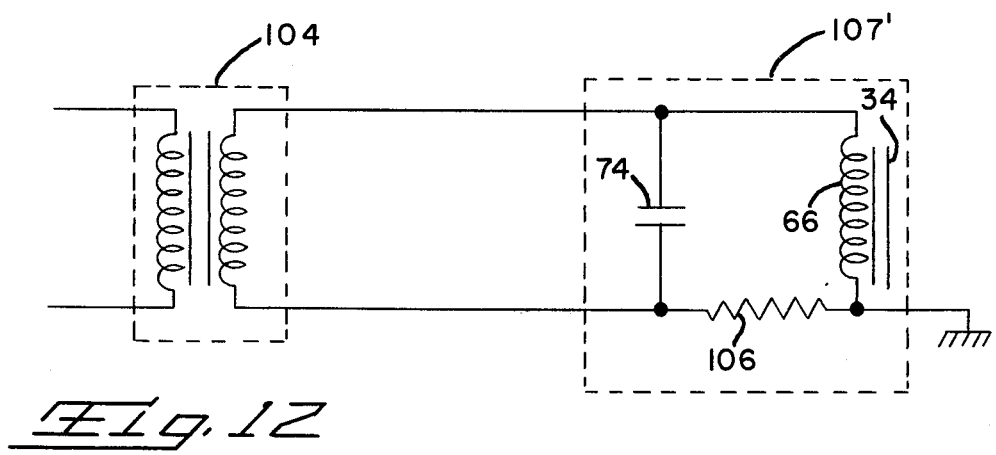
_Fig. 12_

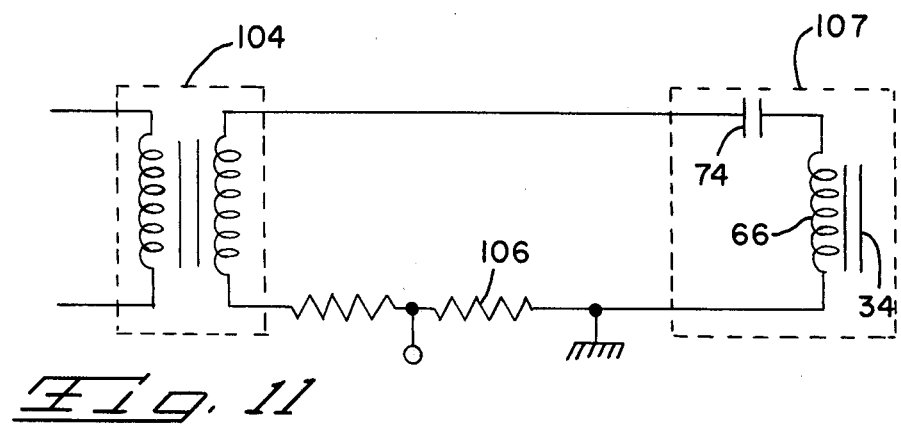
_Fig. 11_
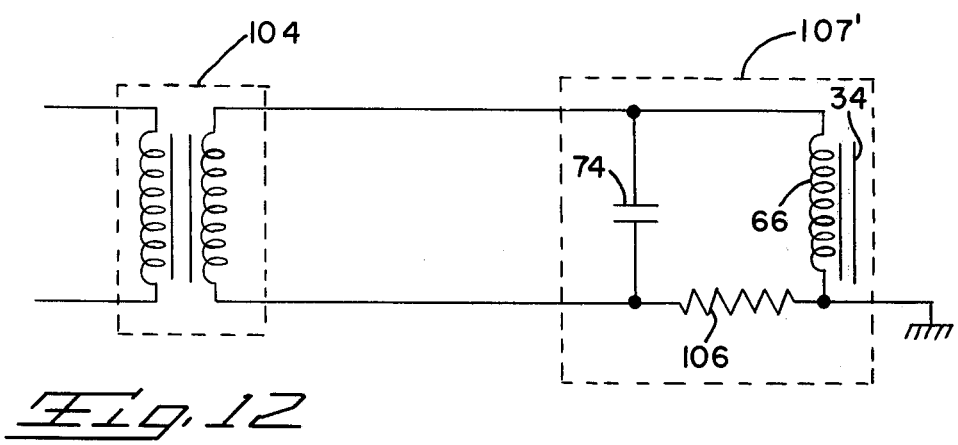
_Fig. 12_

INDUCTION HEATING APPARATUS

CROSS REFERENCE TO PRIOR APPLICATION

This application is a continuation-in-part of U.S. Patent Application Ser. No. 857,955, filed Dec. 6, 1977, now abandoned.

BACKGROUND OF THE INVENTION

This invention relates to induction heating apparatus. The herein disclosed embodiment of the invention is particularly intended for soldering a semi-conductor chip and a substrate to a lead frame; however, the principles of the invention can be used for many other heating processes such as bonding or welding parts to each other, heat treating localized portions of a workpiece, and melting of metals.

The principles of high frequency induction heating have long been known and a variety of types of induction heating apparatus are available or have been proposed. The most commonly used type of induction heating apparatus comprises an induction coil which produces a magnetic field when it is energized. When a conductive workpiece is placed in this field, electrical currents are induced in the workpiece and cause it to be heated, as shown for example in U.S. Pat. Nos. 2,503,429 (Dixon) and 3,038,055 (Ziegler). The problem with such heating coils is that their lack of a core decreases the inductance of their magnetic circuit and thus the flux density of the magnetic field that they can generate and it prevents them from being able to concentrate a high flux density into a small area.

This problem has been partially solved by induction heaters that use, in conjunction with a coil, a core made of magnetic materials having a high permeability, as shown for example in U.S. Pat. Nos. 1,725,465 (Manson), 1,996,502 (Brown), 3,008,026 (Kennedy), 3,038,055 (Ross), 3,835,282 (Sass et al), and 4,048,458 (Zink). One of the problems with many of these core induction heaters is that they have high heat losses in their core if the field intensity and frequency of the fluctuating magnetic field generated in them is increased sufficiently to rapidly solder metal. For example it is believed that, if a magnetic field was generated in the core disclosed in the Brown patent of sufficient intensity and frequency to rapidly melt solder placed between its poles, the core disclosed in Brown would quickly melt. Cores made of the laminated magnetic materials used in most transformers have very high losses due both to eddy currents and to the resulting skin effect at frequencies above 20 kilocycles. In addition, the conductive nature of the laminates presents a real danger of electrical shock when used in induction heaters which have a large amount of power supplied to their exciting coils.

U.S. Pat. No. 2,785,263 (Van Iperen) discloses an induction heating device which has a core made of ferrite. Because of ferrite's relatively high magnetic permeability and low conductivity, it represents an ideal material for the cores of induction heaters. Unfortunately, the U- or H-shaped cores disclosed in Van Iperen are of equal cross-sectional area thoughout the path running between their pole pieces. As a result, in order to saturate those pole pieces so that they make the maximum possible contribution to the flux density in a workpiece placed between them, it is necessary to saturate substantially the whole core, which is very inefficient, and which at high frequencies results in huge heat losses.

OBJECTS AND SUMMARY OF THE INVENTION

Accordingly, it is an object of this invention to provide an induction heating apparatus that avoids the above-described difficulties encountered with the prior art.

More particularly, it is an object of this invention to provide an induction heater which efficiently provides a very intense fluctuating magnetic field between its pole pieces, while requiring relatively little power and having relatively small heat losses elsewhere.

Another object of the invention is to provide an induction heater which can accurately position and clamp a workpiece at the same time that it efficiently passes a fluctuating magnetic field of high flux density through it, and yet which is relatively simple in construction.

Yet another object of the invention is to provide an induction heater which is safe to operate, because it reduces the danger of both burns and electrical shock.

In accordance with an aspect of the invention, an induction heating apparatus for heating an electrically conductive workpiece is provided which comprises a generally C-shaped core made of a magnetic material having a high magnetic permeability and having two opposed ends. The core is designed to efficiently focus a varying magnetic field of high flux density between its two ends, by having the distance between its two ends substantially less than both the height dimension and the width dimension of the core, and by having the core tapered at its two ends so that the area of a cross-section of the magnetic material of the core perpendicular to a path running through the center of the core from end to end is substantially larger throughout most of the core than is the area of such a cross-section near the two ends of the core. The induction heating apparatus further includes an exciting coil surrounding the core and means for supplying a periodic voltage to the exciting coil so as to cause an alternating current to flow in the coil and so as to induce a varying magnetic field into the core and between its two ends.

In accordance with another aspect of the invention, one of the two ends of the core is mounted on a slidable ram portion so that it can be moved towards and away from the other end.

In accordance with yet another aspect of the invention, the induction heating apparatus includes a capacitance connected to the exciting coil to form a resonant circuit with that coil and means for supplying a periodic voltage to the exciting coil which include means for detecting the phase of the current in the resonant circuit and means for altering the frequency and phase of the periodic voltage applied to the resonant circuit in response to the detected current phase so as to cause the resonant circuit to operate at resonance.

The above and other objects, features and advantages of the invention will be apparent in the following detailed description of an illustrative embodiment of the invention which is to be read in connection with the accompanying drawings.

BRIEF DESCRIPTION OF THE DRAWINGS

FIG. 1 is a perspective view of an apparatus in accordance with the invention;

FIG. 2 is a perspective exploded view of the core of the apparatus of FIG. 1;

FIG. 3 is a perspective view of a portion of the coil conductor of the apparatus of FIG. 1;

FIG. 4 is a view taken along lines 4—4 of FIG. 2;

FIG. 5 is a perspective view of a lead frame, a semi-conductor chip, a substrate, and a heat sink which can be soldered together by the apparatus of FIG. 1;

FIGS. 11 and 12 are schematic diagrams of two transducer circuits which can be used with the apparatus of FIG. 1.

DETAILED DESCRIPTION OF A PREFERRED EMBODIMENT

Figure 6:
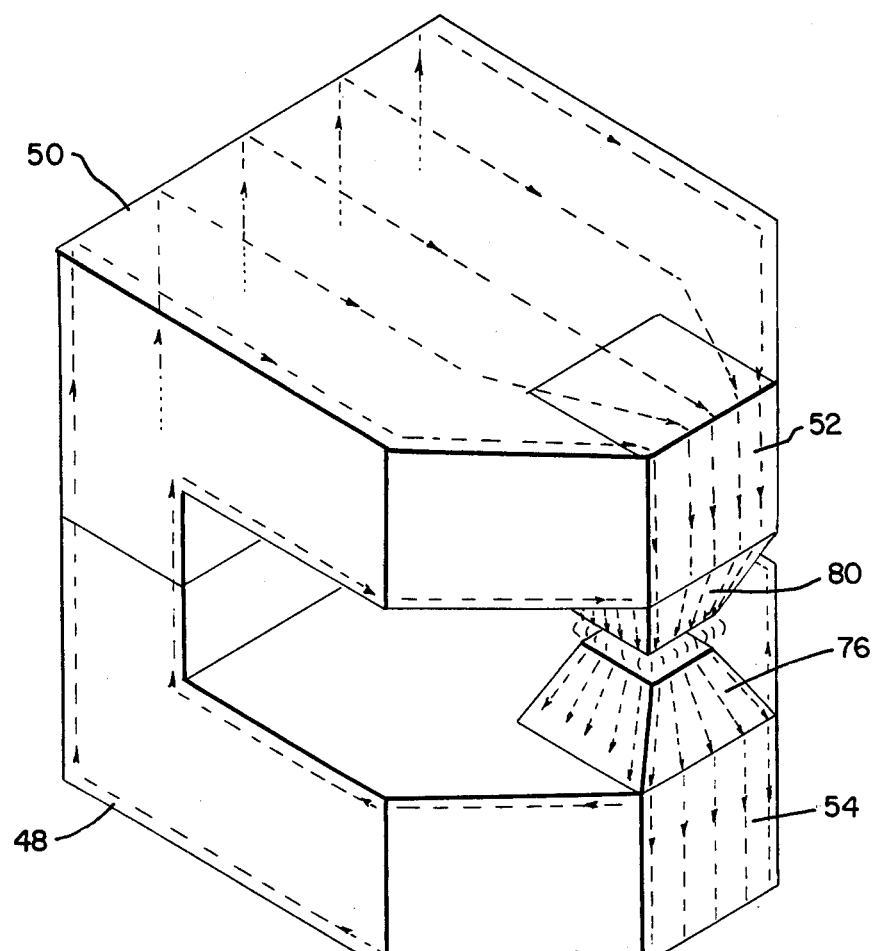
FIG. 6 is a semi-diagrammatic view of the core of the apparatus of FIG. 1, illustrating the flux lines which are established when the core is energized.

FIG. 1 illustrates one preferred embodiment of the present invention, the apparatus 2, which is designed to perform soldering operations such as the soldering of a semi-conductor chip 4 (FIG. 5), a substrate 6, a heat sink 7, and a lead frame 8 to each other. Lead frames of the type shown in FIG. 5 are more fully described in copending application Ser. No. 846,052, U.S. Pat. No. 4,158,745. A brief description of this lead frame is presented below in order to facilitate the description which follows of the induction heating apparatus 2 in accordance with the invention.

The lead frame 8 comprises first, second and third parallel arms 10, 12, and 14, respectively, which extend from a carrier strip 32. The end portions 16 and 22 of the arms 10 and 14, respectively, are reversely bent and extend obliquely over an intermediate portion of the relatively wide second arm 12. The portion 16 of the arm 10 has an enlarged tip 18 so that it will contact the peripheral portions 20 of the upper surface of the integrated circuit chip 4. The tip 24 of the portion 22 of arm 14 is of reduced width and extends through a central hole in the tip 18 of the arm portion 16. The reduced end 24 will thus contact the center 26 of the chip 4. The substrate 6 is of insulating material but it is metallized on its underside so that it can be bonded to the heat sink 7 and the upper surface of the substrate has three metallized bands as shown at 5 so that the arms 10, 12, 14 of the lead frame 8 can be bonded to these bands. The lead frame also has integral tabs 28, 29 and 30 extending from the arms as shown, and which are dimensioned to be mated with complementary connecting devices. The tabs 28 and 29 extend parallel to the carrier strip from the first and third arms, 10 and 14, and the tab 30 extends perpendicular to the carrier strip from the arm 12.

Turning now to FIGS. 1–4, the apparatus 2 comprises a generally C-shaped ferrite core 34, which is contained in a frame or housing 36. The housing 36 comprises a base plate 38, spaced apart upwardly extending side plates 40, and a top plate 42. A support plate 44 is mounted on the upper surface of the base plate and the core 34 is supported on the support plate. The base plate, the side plates, the support plate, and the top plate are all of suitable insulating material such as fiber board and the parts are held in assembled relationship by fasteners 46 which are also of insulating material so that no electrical currents will be induced in the housing. The lower fasteners 46a extend through slots 45 in the side plates to permit relative movement of the side plates. Non-conductive bolts 47 extend between the top plate 42 and the support plate 44 and serve to hold the core in its assembled condition as described below.

The core 34 of the disclosed embodiment is composed of two generally L-shaped composite ferrite members 48 and 50 (FIG. 2), which are substantially identical, so that a description of one will suffice for both and the same reference numerals, differentiated by prime marks, will be used for corresponding structural features of the members 48 and 50. The core comprises, in addition to the L-shaped members 48 and 50, a movable core portion, or ram, 52, and a removable ferrite anvil member 54, as will be described below.

The composite core portion 48 is made up of three generally L-shaped ferrite members, outer L-shaped members 56 having beveled ends 58, which define surfaces that converge and surround a recess 62, which is in front of the center ferrite member 60. The three ferrite members can be bonded to each other by a suitable epoxy adhesive. Alternatively, the entire core, excluding the slidable member 52, can be produced as a single piece if desired, but good results can be obtained if the core is produced as shown in FIG. 2 from commercially available ferrite core shapes which can be ground or machined as required.

The exciting coil 66 comprises a number of windings of flat ribbon-like conductor 70 (FIG. 3) and an insulating film 72 which is interleaved between adjacent turns. The film 72 is relatively wider than the conductor 70 in order to provide a relatively high barrier between adjacent turns of the coil. The coil is wound on an open rectangular frame 6 and is assembled on one of the core members 48 or 50 prior to assembling of those two members to each other. The two core parts 48 and 50 are clamped against each other by the bolts 47, the oversized slots 45 for the lower fasteners 46a permitting the relative movement of the side plates 40 when the bolts 47 are tightened.

The previously identified anvil 54 of ferrite material is dimensioned to be fitted relatively snugly in the recess 62 and the upper end of this anvil block is tapered as shown at 76 so that the flux lines will be convergent in the vicinity of the air gap between anvil 54 and ram 52. A workholding member 78 of an electrically and thermally insulating ceramic material is mounted on the upper end of the anvil and the upper surface 94 of this workholder is recessed as shown at 96 so that the workpiece, the lead frame 8, will be precisely located and held in a desired location thereon. The movable portion or ram 52 of the core also has a tapered end portion 80, and an electrically and thermally insulating workholding member 82, of material similar to that of the workholder 78, is bonded to the end of the ram 52. The downwardly facing surface of the insulating workholder 82 may also be contoured or recessed in a manner which insures precise location of the workpiece in the air gap between anvil 54 and ram 52.

The insulating ceramic material of which workholding members 78 and 82 are made has a magnetic permeability close to that of air. This means it has little effect upon the shape and density of the flux lines which pass between ends 76 and 80. As can be seen from FIG. 2 the workholding member 78 has a substantially larger area than the tip of end 76 upon which it is mounted. As a result, the flux lines which pass through workholding member 78 are concentrated in an area substantially less than the total area of that workholder. This allows a workpiece to be supported by a workholding surface 94 which is substantially larger than the area through which most of the heating energy which is applied to such a workpiece will pass. Thus it is possible to securely hold workpieces without disturbing the concentration of flux lines passing between ends 76 and 80, and, as a result of the locating means provided by the rise between the recessed portion 96 and the non-recessed portion of surface 94 of the workholding member 78, it is possible to accurately position a workpiece on workholding member 78 and to direct heating energy at only a portion of it.

Besides securely holding a workpiece, workholding members 78 and 82 function to protect the more expensive ferrite in the ends 76 and 80 from wear, and they thermally insulate the core from the workpiece, which prevents the core from undesirably cooling the workpiece, and the workpiece from undesirably heating the core.

The movable core member, ram 52, is slidably contained in the recess 62' and extends through a notch in the top plate 42 as shown in FIG. 1, a retaining bar 84 being provided to assist in guiding the member 52 along its path of reciprocation. The upper end of the slidable portion 52 is secured to the end of piston rod 86 which extends from a pneumatic piston and cylinder assembly 88. Compressed air is supplied to this piston and cylinder by air lines 90 and the lower cylinder head is secured to the upper end of a bracket 92 which extends from the top plate 42 of the housing.

Figure 7:
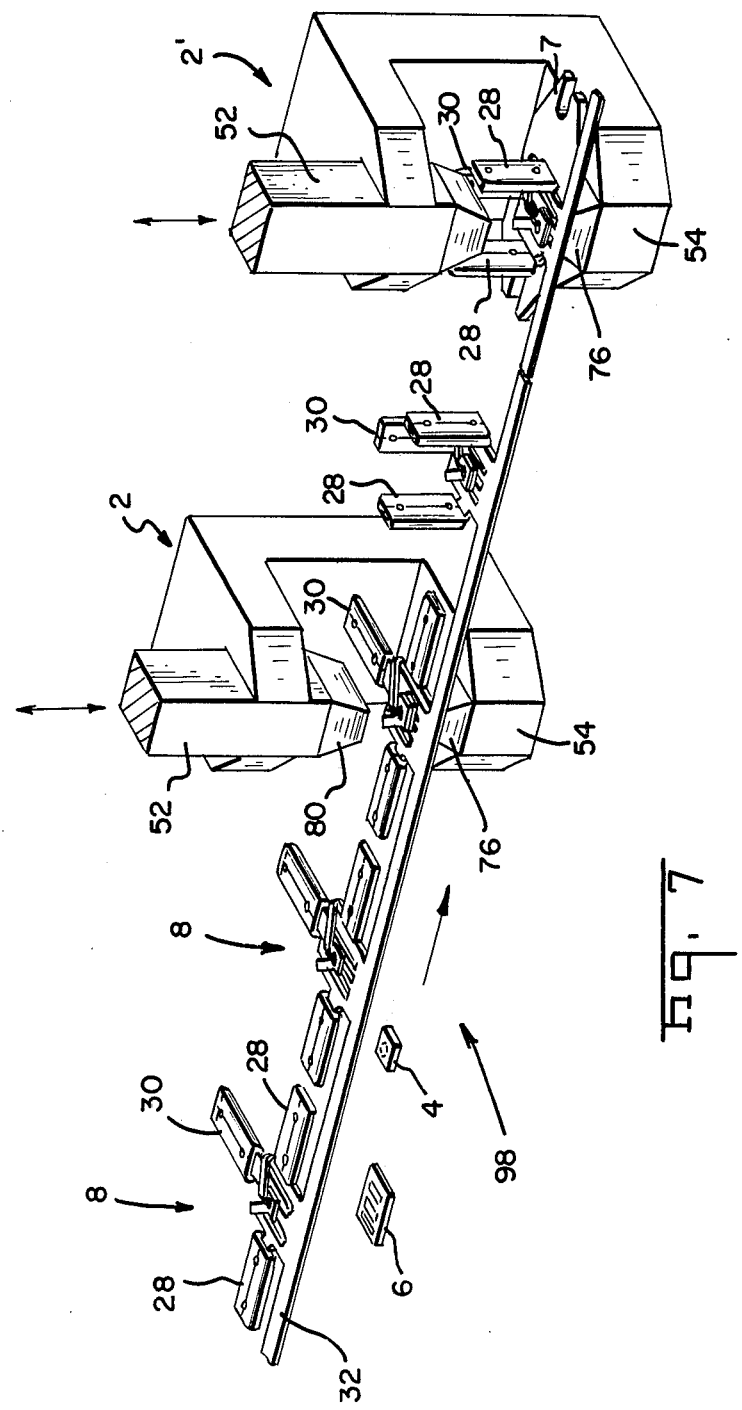
FIG. 7 is a perspective view illustrating a manner of using induction heating apparatus of the type shown in FIG. 1 for the serial production of semi-conductor packages.

FIG. 7 shows a portion of a production line for bonding chips 4, substrates 6, and heat sinks 7 onto lead frames 8, which lead frames are originally in the form of a continuous strip. The surfaces which are to be soldered to each other (the surfaces of the chip 4 and the metallized surfaces of the substrate) are pre-coated with solder. As shown in this figure, the lead frame strip is fed past two induction heating units 2, 2', each constructed in accordance with the invention.

A semi-conductor chip 4 is loosely assembled to each lead frame at a location upstream from the heating unit 2. The chip is positioned on the upper surface of the arm 12 with the portions 20 of the chip beneath the enlarged end 18 of the arm 10. When a lead frame is fed to the heating unit 2, a substrate 6 is positioned on the upper surface of the workholding member 78 and in the recess 96. Thereafter, the pneumatic cylinder 88 is pressurized to drive the movable core member 52 downwardly until the workholding member 82 moves against the arm 22. If the lower surface of workholding member 82 is properly contoured, it is possible for that workholding member to contact both arms 22 and 16 separately.

At this stage of the operating cycle, the substrate 6, the lead frame 8, the chip 4, and the arms of the lead frame will be clamped between the workholders 78, 82 and the surfaces which are to be bonded to each other will be held firmly against each other. The coil of the heating unit 2 is then energized and flux lines are established in the core as illustrated diagrammatically in FIG. 6. As can be seen from FIG. 6, the ends of core 34 are tapered at the ends 58 and 58' of L-shaped members 56 and 56', respectively, and at the ends 76 and 80 of anvil 54 and ram 52, respectively, so that the area of a cross-section of the ferrite perpendicular to a path running through the center of the core from end 76 to end 80 is substantially larger throughout most of core 34 than is the area of such a cross-section near those two ends. As these flux lines approach the air gap, they are caused to converge by virtue of the tapered ends at 58, 58', 76 and 80, so that the flux density near ends 76 and 80 and in the short gap between these two ends is much more concentrated that that in the majority of the core, which has a much greater cross-sectional area. The concentrated and focused flux lines thus pass through the clamped members and induce electrical currents which heat the clamped members causing melting of the solder. Advantageously, after the solder has been melted, the power supply to the coil is switched off so that heating ceases and the parts will be held in their clamped condition for a short time interval until the solder freezes.

After the substrate 6 and the IC chip 4 have been bonded to a lead frame 8, the lead frame is fed from the heating unit 2 and tabs 28, 29 and 30 are bent upwardly. After another feeding step has taken place and at the next station, a heat sink 7 is bonded to the underside of the substrate by the heating unit 2'. After this soldering process has taken place, arms 10, 12 and 14 can be cut from carrier strip 32 so as to be electrically disconnected from each other.

The amount of heat created by eddy currents in a given material as a result of a periodically fluctuating magnetic field varies roughly as a function of the square of the frequency of the fluctuations of the magnetic field times the square of the flux density of the fluctuating magnetic field. Thus core 34 provides a very efficient means for inductively heating a conductive workpiece placed between its two ends 76 and 80, since it causes a high flux density in that part of the magnetic circuit which is passed through the workpiece, achieving the greatest possible heating capacity, but it causes a much lower flux density throughout most of the core, keeping heat losses in the core at a minimum. In fact, experiments have shown that the heat losses in apparatus 2 are so low that it can properly solder a workpiece placed between its two ends 76 and 80 without having those ends become too hot for a human to touch. In the embodiment of the invention shown in FIGS. 1-4, the power supply and exciting coil 66 are designed to induce a varying magnetic field in core 34 which is sufficiently high in flux to saturate the ferrite at the tips of ends 76 and 80, but which, at the same time, is sufficiently low in flux that it falls substantially short of saturating the ferrite throughout most of the remainder of the core. This causes the ferrite in the tips of ends 76 and 80 to make the maximum possible contribution to the flux density in the air gap between those ends, while at the same time keeping the heat losses throughout the core at a relatively low level.

The core 34 can be of any one of a wide variety of ferrite materials which are commercially available. In general, ferrite materials have extremely high magnetic permeability and have very low electrical conductivity, eddy current and hysteresis losses. The losses and the performance of the core in general are not significantly affected by the fact that the ram member 52 is movably mounted in the recess 62' and by the fact that the anvil 54 is removably contained in the recess 62. Similarly, the fact that the portions 48 and 50 of the core are composite members of bonded ferrite chips does not have an undue adverse effect.

The ferrite material selected for the core should have relatively good physical properties so that it will be durable physically and will be able to withstand the stresses imposed upon it when the workpieces are clamped between the anvil 54 and the movable ram 52. A material which has been found satisfactory is a commercially available ferrite material sold as W-5 by the Allen-Bradley Magnetics Division of Milwaukee, Wisconsin. This material has a compressive strength of $2.0 \times 10^5$ psi, a tensile strength of $4.1 \times 10^3$ psi and a Young's modulus of $2.2 \times 10^7$ psi. A core member including the ram 52 can be designed with this material which will impose a significant compressive force on the workpiece while being heated. In fact, under some circumstances it may be desirable to deform the workpiece by means of the ram and anvil, and the material noted above is capable of carrying out such operations.

It can be seen that ram 52 and anvil 54 of core 34 provide means for completing a magnetic circuit through, concentrating flux upon, and applying compressive force on a workpiece placed between ends 76 and 80. In addition, the slidable ram makes it possible to easily insert and remove a workpiece into and from the gap between ends 76 and 80, and, by causing ram 52 to be pushed toward anvil 54 while a workpiece is between them, the gap between ends 76 and 80 is decreased, concentrating even further the flux passing through the workpiece.

Figure 8:
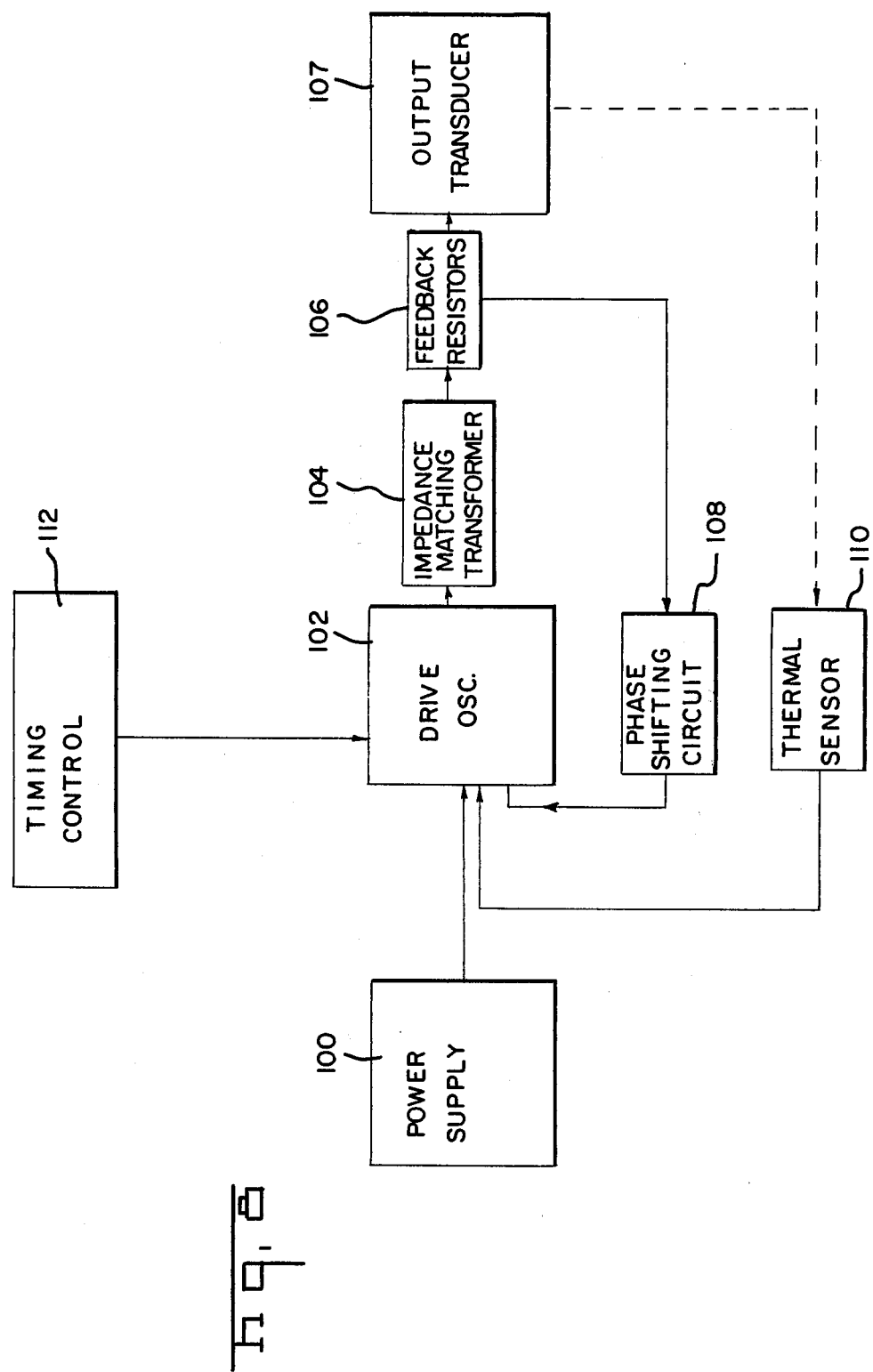
FIG. 8 is a block diagram of the electrical circuitry of the apparatus of FIG. 1.

As shown in the block diagram of FIG. 8, the complete apparatus comprises a power supply 100 which supplies 60 volts DC, a drive oscillator 102 connected to the power supply, an impedance matching transformer 104, feedback resistors 106 which provide a voltage feedback for the phase shifting circuit 108, and the transducer 107 which as can be seen from FIG. 11 is made up of the core 34, the coil 66, and a capacitor 74 connected in series with the coil 66. Control of the heating process may be achieved by means of a timing control means 112 or a thermal sensor 110 which senses the temperature of the workpiece, or both. Under some circumstances, the timer 112 may be able to control the heating process with sufficient precision, but under other circumstances the thermal sensor 110 may be preferable.

Figure 10:
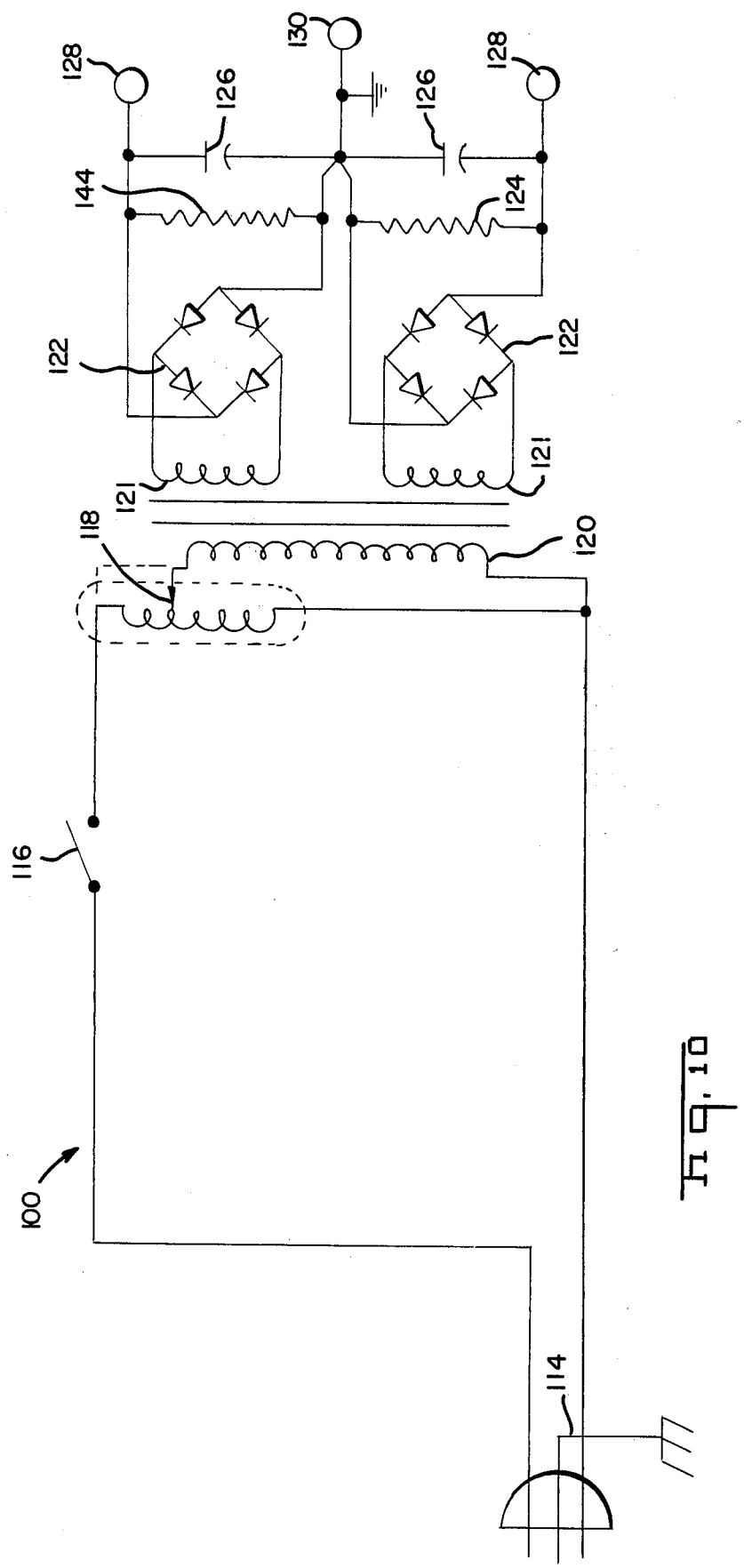

Referring now to the schematic diagrams, the power supply 100 (FIG. 10) comprises a source 114 of 115 volt alternating current, a switch 116 so that the entire apparatus can be deenergized, a variable auto-transformer (a Variac) 118 and a 60 Hz power transformer 120. The two secondaries 121 of the power transformer are connected to bridge rectifiers 122 and bleeder resistors 124 in parallel with filter capacitors 126. The positive and negative outputs of the power supply and the common conductor for these outputs are shown at 128, 129, and 130, respectively.

Figure 9:
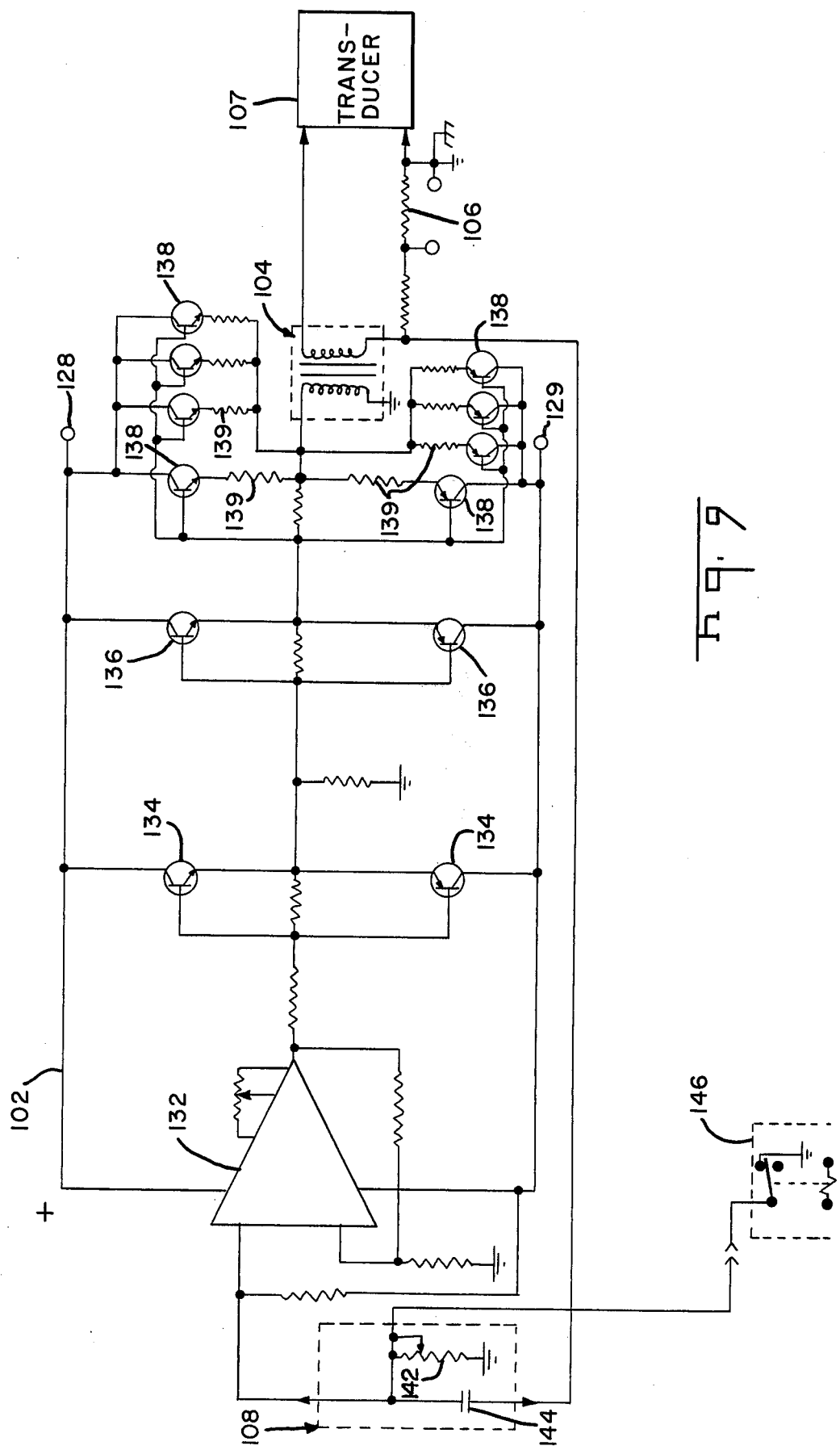
FIGS. 9 and 10 are schematic diagrams of the circuitry of the apparatus of FIG. 1.

The drive oscillator 102 (FIG. 9) includes a voltage amplifier 132. The output of voltage amplifier 132 is connected to first and second transistorized impedance matching stages, two complementary transistors 134 being provided in the first stage and two complementary transistors 136 being provided in the second stage. These transistors provide the current gain for driving the power output stage. The complementary transistor power output stage, like the two impedance matching stages and the voltage amplifier, is connected between the positive and negative DC voltage lines 128 and 129, respectively, from the power supply 100.

In this embodiment of the invention, the complementary transistor power output stage comprises 4 pairs of complementary transistors 138. Each complementary pair of transistors 138 includes an NPN transistor with its collector connected to the positive DC voltage line 128 and a PNP transistor with its collector connected to the negative DC voltage line 129. The emitters of both transistors 138 in each complementary pair are connected through emitter resistors 139 to the input of an impedance matching transformer 104. The bases of both transistors 138 in each complementary pair are connected to the output of the second impedance matching stage which contains complementary transistors 136.

The output of this second impedance matching stage provides a control signal which substantially is of the same voltage amplitude and phase as the voltage which is to be supplied to the impedance matching transformer 104. The NPN transistors 138 constitute positive switching devices which conduct between their collectors and emitters when the voltage of their emitters is lower than that of their collectors and bases by more than their base-emitter offset voltage. Similarly, the PNP transistors 138 constitute negative switching devices which conduct between their collectors and emitters when the voltage of their emitters is higher than that of their collectors and bases by more than their base-emitter offset voltage. As a result, the voltage applied by the power output stage to the impedance matching transformer 104 substantially follows that of the control signal supplied by the second transistorized impedance matching stage. In addition, if the transducer 107 or the impedance matching transformer 104 tends to induce a voltage at the output of the power output stage that differs from the control signal by more than the base-emitter offset voltage of transistors 138, then either the four NPN or the four PNP transistors 138 will conduct a sufficient amount of current to rapidly remove such a voltage difference. This last property of the power output stage greatly increases the safety of operating a transducer, such as transducer 107, which has a large inductance, and thus is capable of generating large voltage spikes.

The emitter resistors 139 cause all four of the NPN transistors 138, and similarly all four of the PNP transistors 138, to conduct current evenly, thus decreasing the likelihood that any one will burn out.

The previously identified impedance matching transformer 104, which serves as a power output transformer, is connected as shown to the feedback resistors 106 in series with the transducer 107 thereby to develop a feedback voltage between the two terminals of the feedback resistor which will be proportioned to, and in phase with, the transducer current and which will be detected by the phase shifting circuit 108.

The phase shifting circuit 108 comprises a variable resistor 142 and a capacitor 144 as shown. The phase shifting circuit corrects for phase shifts in the drive oscillator 102, so that the phase of the voltage supplied to the resonant circuit comprising exciting coil 66 and capacitance 74 will be in phase with the current flowing in feedback resistance 106, causing transducer 107 to operate at resonance.

In accordance with the principles of the invention, high voltage (about 7,000 to 10,000 volts) is achieved across exciting coil 66 from an ordinary 60 cycle 115 volt power source. This is done by converting the 115 volt AC to plus and minus 60 volts DC in the power supply 100, which plus and minus voltages are supplied by lines 128 and 129, respectively, to drive oscillator 102, whose output is applied across the primary of the impedance matching transformer 104. The output of the impedance matching transformer is fed to the transducer 107 which is a series resonant circuit comprised of exciting coil 66 and capacitance 74. The feedback resistance 106 develops a feedback voltage which is phase corrected in circuit 108 and fed to the voltage amplifier 132 which drives a first impedance matching stage comprising transistors 134, which, in turn, drives a second impedance matching stage, comprising transistors 136, which, in turn, drives the power output stage, comprising transistor 138.

The switching wave form applied to the series resonant circuit of transducer 107 is essentially square. The filtering effect of the series resonant circuit produces a sine wave of current through the circuit. This current is used to develop feedback voltage across feedback resistors 106. The voltage drop across the reactive elements, the inductor and capacitor, is "Q" times the voltage across the secondary of the power transformer, "Q" being the ratio of energy stored per cycle to energy dissipated per cycle. Thus the current through the circuit is sufficient to develop the necessary field in the pole pieces 76 and 80 of the transducer, and is limited only by the dissipative elements in the total circuit, a component of which is the energy spent in the workpiece and reflected into the inductive element. The inductor thus becomes a transformer during its use as a heating device.

The circuitry described above is particularly advantageous when used with a core having a movable portion such as the ram 52 by virtue of the fact that the circuitry will adapt itself to changes in the length of the air gap between end 76 and 80. When the air gap is changed, there is a resulting deviation in resonant frequency and phase shift. The addition of a workpiece also causes a deviation in frequency and phase shift. The circuitry of the present invention, however, brings the system to resonance at the new resonant frequencies and maximum energy is imparted to the workpiece in accordance with the prevailing conditions.

The transducer 107 shown in FIG. 11, in which the capacitor 74 and the exciting coil 66 are in series, draws more current when a conductive workpiece is not placed between its ends 76 and 80 than when such a workpiece is so placed. This is because the energy required to heat a workpiece placed between ends 76 and 80 acts as a load in the transducer circuit, raising the impedance of the transducer 107 at resonance, thus decreasing current flow. This fact causes little problem if the voltage supplied to transducer 107 is turned on and off each time a workpiece is heated, but it would prove wasteful if the transducer was left on continuously.

If the transducer of apparatus 2 is to be left on continuously, it may be best to wire its transducer in parallel as shown at 107' in FIG. 12. In transducer 107' the exciting coil 66 and capacitor 74 are in parallel relative to the applied voltage. Such a parallel circuit actually draws more current when it has a conductive workpiece placed between ends 76 and 80. Thus such a parallel circuit is more efficient in applications where the voltage supplied to the transducer of apparatus 2 is to be left on.

If the transducer 107' is wired as shown in FIG. 12, the feedback resistor 106 can be placed in series between the exciting coil 66 and the capacitance 74, so as to measure the phase of the current flowing between the coil and the capacitor. If the feedback resistor 106 is so placed, the phase shifting circuit 108 should be modified to cause the voltage applied to impedance matching transformer 104 to be 90° out of phase with the phase of the voltage generated across the terminals of feedback resistor 106. Also since a parallel resonant circuit offers a higher impedance at resonance than a series resonant circuit, a higher voltage must be applied to transducer 107' than to transducer 107 in order to produce the same current flow through exciting coil 66. In order to provide such high driving voltages, it may prove necessary to change the power supply 100 so that it produces higher DC voltages, to use tubes in the power output stage of the drive oscillator to handle such higher voltages, and to cause the impedance matching transformer 104 to have a higher step-up ratio.

The transducers of apparatus 2, whether they be serial as transducer 107 or parallel as transducer 107', are designed to resonate at a frequency between twenty and two hundred kilocycles. At frequencies much above two hundred kilocycles, the heat losses in the ferrite core become too high, and at frequencies below twenty kilocycles, it is hard to achieve sufficient heating power in the gap between ends 76 and 80.

Several advantages are achieved by the practice of the invention as described above. The combination of the circuitry described and the core of ferrite material makes possible the achievement of an extremely compact induction heating unit which is miserly in its use of energy, which can be produced at an extremely low cost, and which presents a greatly reduced shock hazard to the operator, as compared with other types of induction heating devices. The low cost is achieved by virtue of the relatively low cost of the ferrite members and the relative simplicity of the power supply.

Another advantage of the invention disclosed herein is its ability to provide rapid induction heating without posing a substantial danger of electrical shock. Because of the previously mentioned ability of apparatus 2 to concentrate flux in a small area at the portion of a magnetic circuit where the workpiece is located without suffering substantial losses throughout most of the remainder of that magnetic circuit, the apparatus uses relatively low voltage and current for the amount of heat it can generate between ends 76 and 80. Furthermore, because its core is made of ferrite, which is a very poor conductor, one can touch ends 76 and 80 while power is supplied to transducer 107 without receiving a shock. In addition, it is suggested that support plate 44 and top plate 42 be lined with sheets of grounded conducting material on their surfaces that are in contact with the bottom and top, respectively, of core 34, so that the chance of receiving a shock from core 34 is even further reduced. The electrically insulating workholders 78 and 82, reduce the chance that the workpiece or the operator will touch the core, making apparatus 2 safer still. And the power output stage of drive oscillator 102 greatly increases the safety of apparatus 2 by allowing great amounts of current to flow through transistors 138, if necessary, to prevent voltage spikes from being formed by transducer 107.

It should be noted that transistors 138 allow apparatus 2 to be rapidly turned on and off without the danger of large induced voltage spikes. The start and stop switch 146 (FIG. 9), which can be operated manually, or automatically by timing circuit 112 or the thermal sensor 110, operates to shut off the transducer 107 by grounding the input of voltage amplifier 132. This causes the control signal supplied to the power output stage of the drive oscillator 102 to acquire a potential substantially equal to ground while the power output stage remains on, so that any tendency of transducer 107 to produce a voltage spike is avoided by the operation of transistors 138.

The specific embodiment disclosed provides other important advantages which are related to the use of the movable ram member as part of the core, the convergent or tapered ends of the ram and the removable core section, or anvil, 54, and the provision of the insulating workholding members 78, 82 on the ends of the ram 52 and anvil 54. The insulating workholders 78, 82 permit movement of the ram 52 towards the workpiece on the workholder 78 so as to reduce greatly the size of the air gap without causing the end 76 or 80 to touch the workpiece, which would draw heat from the workpiece and which might damage the ends 76 and 80. The workpiece is precisely located on the workholder 78 by virtue of the fact that its surface is recessed as shown at 96. As a result, a precisely predetermined section or portion of the workpiece is located in the concentration of flux lines and thus is heated selectively. The tapered ends 76, 80 serve to concentrate or focus the flux lines and thereby further insure that most of the heat will be developed in a precisely predetermined zone of the workpiece.

The movable ram 52 can also serve as a force applying member while the heating step is being carried out. In the disclosed embodiment, this ability of the ram 52 is utilized to clamp the parts being soldered and hold them in intimate contact while the solder is melted and for a period after the power supply is cut off in order to permit solidification of the solder. The ram can also be employed to impose more substantial forces on a workpiece during the heating step since, as explained above, ferrite materials have good mechanical strength, particularly in compression.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An induction heating apparatus for heating an electrically conductive workpiece, said apparatus comprising:

a generally C-shaped core made of a magnetic material having a high magnetic permeability and having two opposed ends, said core being designed to efficiently focus a varying magnetic field of high flux density between said two ends, the distance between said ends being substantially less than both the height dimension and the width dimension of said core and said core being tapered at said two ends so that the area of a cross-section of said magnetic material perpendicular to a path running through the center of said core from end to end is substantially larger throughout most of the core than is the area of such a cross-section near said two ends;

a resonsant circuit including a capacitance and an exciting coil surrounding said core; and driving means for supplying a periodic voltage to said resonant circuit so as to cause an alternating current to flow in said resonant circuit and in said coil, said driving means including means for detecting the phase of said current flowing in said resonant circuit and means for altering the frequency and phase of the periodic voltage supplied by said driving means to said resonant circuit so that said supplied voltage has a predetermined phase relationship to said current in said resonant circuit, the maintenance of which phase relationship causes said resonant circuit to operate at resonance;

wherein said means for altering the frequency and phase of the periodic voltage supplied by the driving means includes control means for producing a control signal as its output which has substantially the same amplitude and phase as the voltage which is to be supplied by said driving means to said resonant circuit, and wherein said driving means includes a power amplifier which has an output which is connected to said resonant circuit, a source of relatively positive voltage, a source of relatively negative voltage, and at least one positive and at least one negative switching device, each switching device having an input, an output and a control electrode, said positive switching device including means for conducting between its input and its output electrode when the voltage of its output electrode is significantly less than that of its input and control electrodes, and said negative switching device including means for conducting between its input and its output electrode when the voltage of its output electrode is significantly greater than that of its input and control electrodes, said input electrode of said positive switching device being connected to said source of relatively positive voltage, said input electrode of said negative switching device being connected to said source of relatively negative voltage, said output electrodes of each said switching device being connected to said output of said power amplifier, and said control electrode of each said switching device being connected to said output of said control means so that, if said resonant circuit tends to cause the voltage at said output of said power amplifier to be significantly different than that of the control signal, at least one of said switching devices will conduct current to said output of said power amplifier until its voltage does not differ significantly from that of said control signal.

2. An induction heating apparatus as in claim 1, further comprising stopping means for causing said driving means to stop applying a periodic voltage to said resonant circuit, said stopping means including means for causing said control signal to acquire a potential substantially equal to ground while said power amplifier remains in operation.

3. An inductive heating apparatus as in claim 1, wherein said magnetic material having a high magnetic permeability is ferrite.

4. An induction heating apparatus as in claim 3, further comprising stopping means for causing said driving means to stop applying a periodic voltage to said resonant circuit, said stopping means including means for causing said control signal to acquire a potential substantially equal to ground while said power amplifier remains in operation.

5. An induction heating apparatus as in claim 3 wherein said driving means causes said exciting coil to induce a varying magnetic field in said core which saturates said ferrite at said two ends but which falls substantially short of saturating said ferrite throughout most of the remainder of said core.

6. An induction heating apparatus as in claim 3 wherein said resonant circuit resonates at a frequency between 20 and 200 kilocycles.

7. An induction heating apparatus as in claim 3, further including means for electrically grounding one or more surfaces of said core.

8. An induction heating apparatus for heating an electrically conductive workpiece, said apparatus comprising:

a generally C-shaped core made of ferrite and having two opposed ends, said core being tapered at said two ends so that the area of a cross-section of said ferrite perpendicular to a path running through the center of said core from end to end is substantially larger throughout most of the core than is the area of such a cross-section near said two ends, and said core having a slidable ram portion on which one of said ends is located so that said one end can be moved toward and away from the other of said ends;

pushing means for pushing said ram portion so that said one end approaches said other end and for withdrawing said ram portion so that said one end is withdrawn from said other end;

two workholders, one placed on each of said two ends, made of electrically insulating material for compressing said workpiece when said workpiece is placed between said workholders and said pushing means pushes said one end toward said other end;

a resonant circuit including a capacitance and an exciting coil surrounding said core; and driving means for supplying a periodic voltage to said resonant circuit so as to cause an alternating current to flow in said resonant circuit and in said coil which is part of said resonant circuit, said driving means including means for detecting the phase of said current flowing in said resonant circuit and means for altering the frequency and phase of the periodic voltage supplied by said driving means to said resonant circuit so that said supplied voltage has a predetermined phase relationship to said current in said resonant circuit and thus so that said resonant circuit will operate at resonance regardless of the effect upon said resonant circuit of the position of said ram portion.

9. An induction heating apparatus as in claim 8, wherein said driving means causes said exciting coil to induce a varying magnetic field in said core which saturates said ferrite at said two ends but which falls substantially short of saturating said ferrite throughout most of the remainder of said core.

10. An induction heater as in claim 8, further including means for electrically grounding said core.

11. An induction heating apparatus as in claim 8, wherein said resonant circuit resonates at a frequency between 20 and 200 kilocycles.

12. An induction heating apparatus for heating an electrically conductive workpiece, said apparatus comprising:

a generally C-shaped core made of a magnetic material having a high magnetic permeability and having two opposed ends, the distance between said ends being substantially less than both the height dimension and the width dimension of said core, and said core being tapered at said two ends so that the area of a cross-section of said magnetic material perpendicular to a path running through said core from end to end is substantially larger throughout most of the core than is the area of such a cross-section near said two ends;

an exciting core surrounding said core;

means for supplying a periodic voltage to said coil so as to cause an alternating current to flow in said exciting coil and so as to induce a varying magnetic field into said core and between said two ends; and a workholder made of electrically insulating material mounted on at least one of said ends for supporting said workpiece between said two ends, the cross-sectional area of said workholder lying in the plane perpendicular to the direction between said two ends being substantially larger than such a cross-sectional area of said core near said end upon which it is placed, and said workholder being made of material having a magnetic permeability close to that of air so that said varying magnetic field induced between said two ends and passing through said workholder is concentrated in an area substantially less than the total area of said workholder.

13. An induction heating apparatus as in claim 12, wherein said workholder is made of thermally insulating material.

14. An induction heating apparatus as in claim 12, wherein said workholder has workpiece locating means on its surface facing the one of said ends upon which said workholder is not mounted on, said locating means being for holding said workpiece in a desired position relative to said workholder.

15. An induction heating apparatus for heating and compressing an electrically conductive workpiece, said apparatus comprising:

a generally C-shaped core made of a magnetic material having a high magnetic permeability and having two opposed ends, said core being tapered at said two ends so that the area of a cross-section of said magnetic material perpendicular to a path running through the center of said core from end to end is substantially larger throughout most of the core than is the area of such a cross-section near said two ends, and said core having a slidable ram portion on which one of said ends is located so that said one end can be moved toward and away from the other of said ends;

pushing means for pushing said ram portion so that said one end approaches said other end and for withdrawing said ram portion so that said one end is withdrawn from said other end;

an exciting coil surrounding said core;

means for supplying a periodic voltage to said coil so as to cause an alternating current to flow in said exciting coil and so as to induce a varying magnetic field into said core and between said two ends; and two workholders, one placed on each of said two ends, made of electrically insulating material for compressing said workpiece when said workpiece is placed between said workholders and said pushing means pushes said one end toward said other end, the cross-sectional area of at least one of said workholders in a plane perpendicular to the direction between said two ends being substantially larger than such a cross-sectional area of said core near said end upon which it is placed, and said at least one workholder being made of material having a magnetic permeability close to that of air so that said varying magnetic field induced between said two ends and passing through said at least one workholder is concentrated in an area substantially less than the total area of said at least one workholder.

16. An induction heating apparatus as in claim 15, wherein said workholder is made of thermally insulating material.

17. An induction heating apparatus as in claim 15, wherein at least one of said workholders has workpiece locating means on its surface facing said other workholder for holding said workpiece in a desired position relative to said at least one workholder.

18. An induction heating apparatus as in claim 15, wherein said means for supplying a periodic voltage causes said exciting coil to induce a varying magnetic field in said core which saturates said magnetic material at said two ends but which falls substantially short of saturating the said magnetic material throughout most of the remainder of said core.

19. An induction heating apparatus for heating an electrically conductive workpiece, said apparatus comprising:
a generally C-shaped core made of a magnetic material having a high magnetic permeability and having two opposed ends, said core being tapered at said two ends so that the area of a cross-section of said magnetic material perpendicular to a path running through the center of said core from end to end is substantially larger throughout most of the core than is the area of such a cross-section near said two ends, and said core having a slidable ram portion on which one of said ends is located so that said one end can be moved toward and away from the other of said ends;
pushing means for pushing said ram portion so that said one end approaches said other end and for withdrawing said ram portion so that said one end is withdrawn from said other end;
two workholders, one placed on each of said two ends, made of electrically insulating material, for compressing said workpiece when said workpiece is placed between said workholders and said pushing means pushes said one end toward said other end;
a resonant circuit including a capacitance and an exciting coil surrounding said core; and
driving means for supplying a periodic voltage to said resonant circuit so as to cause an alternating current to flow in said resonant circuit and in said coil which is part of said resonant circuit, said driving means including means for detecting the phase of said current flowing in said resonant circuit and means for altering the frequency and phase of the periodic voltage supplied by said driving means to said resonant circuit so that said supplied voltage has a predetermined phase relationship to said current in said resonant circuit and thus so that said resonant circuit will operate at resonance regardless of the effect upon said resonant circuit of the position of said ram portion.

20. An induction heating apparatus as in claim 19, wherein said core is made of ferrite.

21. An induction heating apparatus as in claim 20 wherein said driving means causes said exciting coil to induce a varying magnetic field in said core which saturates said ferrite at said two ends but which fall substantially short of saturating said ferrite throughout most of the remainder of said core.

* * * * *